(12) United States Patent
Chu et al.

(10) Patent No.: US 11,749,296 B2
(45) Date of Patent: Sep. 5, 2023

(54) VOICE CAPTURING METHOD AND VOICE CAPTURING SYSTEM

(71) Applicant: Realtek Semiconductor Corporation, Hsinchu (TW)

(72) Inventors: Chung-Shih Chu, Hsinchu (TW); Ming-Tang Lee, Hsinchu (TW); Chieh-Min Tsai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 222 days.

(21) Appl. No.: 17/485,644

(22) Filed: Sep. 27, 2021

(65) Prior Publication Data

US 2022/0215856 A1    Jul. 7, 2022

(30) Foreign Application Priority Data

Jan. 5, 2021   (TW) .................................. 110100307

(51) Int. Cl.
  *G10L 21/057* (2013.01)
  *G10L 17/06* (2013.01)
  (Continued)

(52) U.S. Cl.
  CPC ............ *G10L 21/057* (2013.01); *G10L 17/06* (2013.01); *G10L 21/0232* (2013.01);
  (Continued)

(58) Field of Classification Search
  CPC ... G10L 21/057; G10L 17/06; G10L 21/0232; G10L 17/00; G10L 21/0208;
  (Continued)

(56) References Cited

U.S. PATENT DOCUMENTS

| 2016/0005394 A1* | 1/2016 | Hiroe ................... G10L 21/0272 704/248 |
| 2017/0249936 A1* | 8/2017 | Hayashida .............. G10L 15/04 |
| 2020/0184985 A1* | 6/2020 | Nesta ................... G10L 21/0272 |

OTHER PUBLICATIONS

K. Žmolíková et al., "SpeakerBeam: Speaker Aware Neural Network for Target Speaker Extraction in Speech Mixtures," IEEE Journal of Selected Topics in Signal Processing, vol. 13, No. 4, pp. 800-814, Aug. 2019.
(Continued)

*Primary Examiner* — Yogeshkumar Patel
(74) *Attorney, Agent, or Firm* — Locke Lord LLP; Tim Tingkang Xia, Esq.

(57) ABSTRACT

A voice capturing method includes following operations: storing, by a buffer, voice data from a plurality of microphones; determining, by a processor, whether a target speaker exists and whether a direction of the target speaker changes according to the voice data and target speaker information; inserting a voice segment corresponding to a previous tracking direction into a current position in the voice data to generate fusion voice data when the target speaker exists and the direction of the target speaker changes from the previous tracking direction to a current tracking direction; performing, by the processor, a voice enhancement process on the fusion voice data according to the current tracking direction to generate enhanced voice data; performing, by the processor, a voice shortening process on the enhanced voice data to generate voice output data; and playing, by a playing circuit, the voice output data.

20 Claims, 6 Drawing Sheets

(51) Int. Cl.
*G10L 21/0232* (2013.01)
*H04R 1/40* (2006.01)
*H04R 3/00* (2006.01)
*G06N 20/00* (2019.01)
*G10L 21/0216* (2013.01)

(52) U.S. Cl.
CPC .............. *H04R 1/406* (2013.01); *H04R 3/005* (2013.01); *G06N 20/00* (2019.01); *G10L 2021/02166* (2013.01)

(58) Field of Classification Search
CPC .......... G10L 2021/02166; H04R 1/406; H04R 3/005; G06N 20/00; G06N 3/08
See application file for complete search history.

(56) References Cited

OTHER PUBLICATIONS

Z. Wang et al., "Target Speaker Localization Based on the Complex Watson Mixture Model and Time-Frequency Selection Neural Network." Appl. Sci. 2018, 8, 2326.
Y. Nejime et al., "A portable Digital Speech-Rate Converter for Hearing Impairment," IEEE Transactions ʄ on Rehabilitation Engineering, vol. 4, No. 2, pp. 73-83, Jun. 1996.

\* cited by examiner

_(54)_ VOICE CAPTURING METHOD AND VOICE CAPTURING SYSTEM

RELATED APPLICATIONS

This application claims priority to Taiwanese Application Serial Number 110100307, filed Jan. 5, 2021, which is herein incorporated by reference.

BACKGROUND

Technical Field

The present disclosure relates to voice capturing technology. More particularly, the present disclosure relates to a voice capturing method and a voice capturing system.

Description of Related Art

With developments of technology, more and more electrical devices support voice call functions. In general, a voice capturing system in an electrical device needs to collect at least N seconds of voice data to obtain sufficient target speaker information (for example, voice characteristics of a target speaker) for subsequent processing. Accordingly, when the target speaker information is used to perform a spatial enhancement for multi-microphone signals, the voice capturing system in the electrical device knows that the direction of the target speaker changes after N seconds. These will cause delay and distortion.

SUMMARY

Some aspects of the present disclosure are to provide a voice capturing method. The voice capturing method includes following operations: storing, by a buffer, voice data from a plurality of microphones; determining, by a processor, whether a target speaker exists and whether a direction of the target speaker changes according to the voice data and target speaker information; inserting a voice segment corresponding to a previous tracking direction into a current position in the voice data to generate fusion voice data when the target speaker exists and the direction of the target speaker changes from the previous tracking direction to a current tracking direction; performing, by the processor, a voice enhancement process on the fusion voice data according to the current tracking direction to generate enhanced voice data; performing, by the processor, a voice shortening process on the enhanced voice data to generate voice output data; and playing, by a playing circuit, the voice output data.

Some aspects of the present disclosure are to provide a voice capturing system. The voice capturing system includes a buffer, a processor, and a memory. The buffer is configured to store voice data from a plurality of microphones. The processor is configured to determine whether a target speaker exists and whether a direction of the target speaker changes according to the voice data and target speaker information. The memory is configured to insert a voice segment corresponding to a previous tracking direction into a current position in the voice data to generate fusion voice data when the target speaker exists and the direction of the target speaker changes from the previous tracking direction to a current tracking direction. The processor is further configured to perform a voice enhancement process on the fusion voice data according to the current tracking direction to generate enhanced voice data, and perform a voice shortening process on the enhanced voice data to generate voice output data. The voice output data is played by a playing circuit.

As described above, the voice capturing method and the voice capturing system of the present disclosure can prevent the voice data from being delayed and from being distorted when the direction of the target speaker changes.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
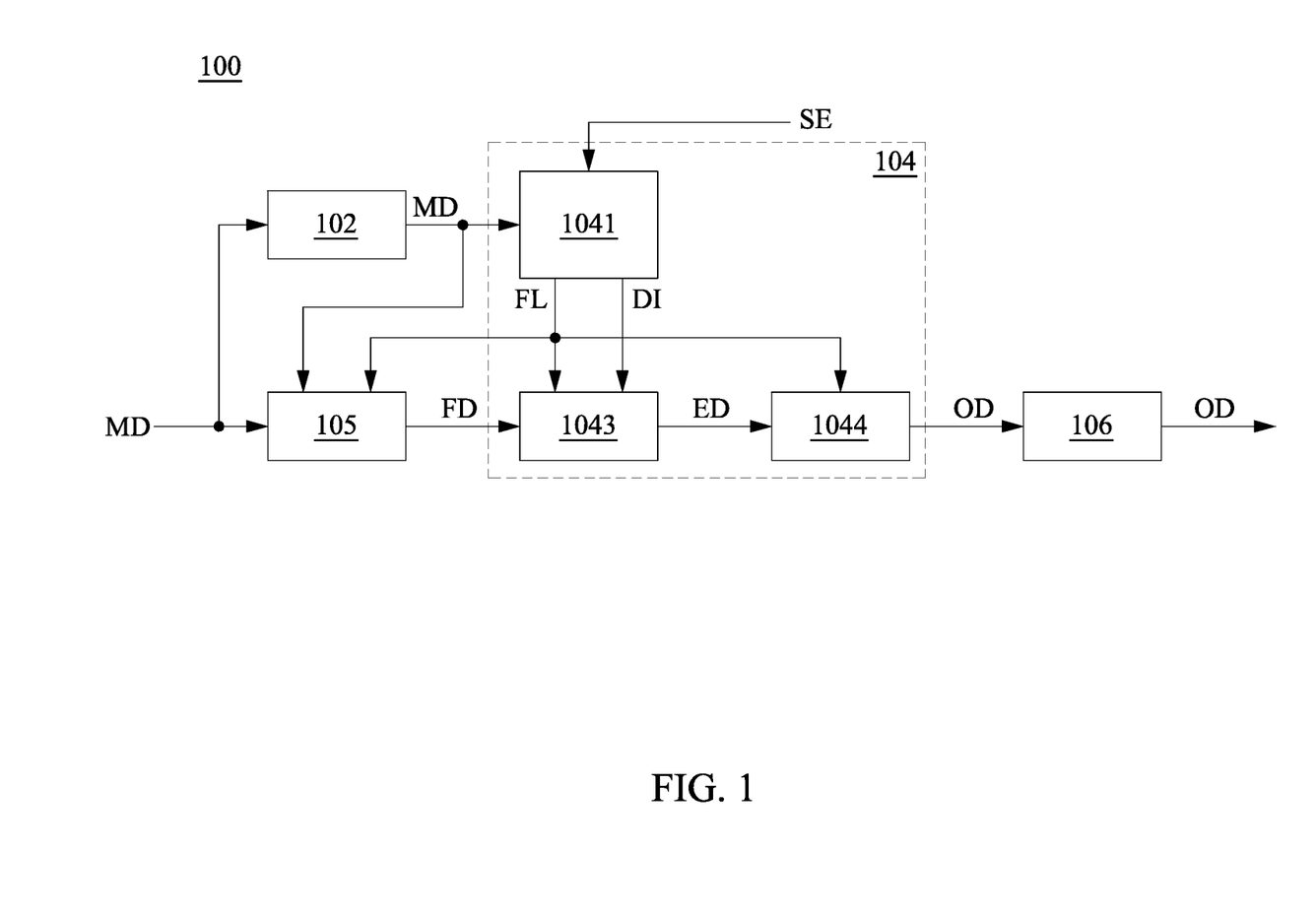
FIG. 1 is a schematic diagram of a voice capturing system according to some embodiments of the present disclosure.

Reference is made to FIG. 1. FIG. 1 is a schematic diagram of a voice capturing system 100 according to some embodiments of the present disclosure. In some embodiments, the voice capturing system 100 is disposed in a cell phone, a notebook computer, or various electrical devices.

As illustrated in FIG. 1, the voice capturing system 100 includes a buffer 102, a processor 104, a voice combining device 105, and a playing circuit 106. The processor 104 is coupled to the buffer 102. The playing circuit 106 is coupled to the processor 104. In some embodiments, the voice combining device 105 can be implemented by a memory.

The buffer 102 is configured to receive voice data MD from a plurality of microphones, and store the voice data MD. In some embodiments, the buffer 102 can temporarily store data with at least N seconds.

The processor 104 includes a target speaker tracking unit 1041, a voice enhancement unit 1043, and a voice shortening unit 1044. In some embodiments, the target speaker tracking unit 1041, the voice enhancement unit 1043, and the voice shortening unit 1044 can be implemented by software. For example, the processor 104 can read codes stored in a non-transitory computer readable recording media to perform functions of the target speaker tracking unit 1041, the voice enhancement unit 1043, or the voice shortening unit 1044.

The target speaker tracking unit 1041 is configured to receive target speaker information SE and the voice data MD stored in the buffer 102. The target speaker information SE includes voice characteristics of a target speaker. In some embodiments, the target speaker can pre-record a voice speech in a noise-free or low-noise environment. Then, the target speaker information SE is i-vector obtained by performing a factor analysis on the pre-recorded voice speech or the target speaker information SE is x-vector obtained by performing a deep learning process. The target speaker tracking unit 1041 can generate flag information FL and a tracking direction DI according to the target speaker information SE and the voice data MD. The flag information FL can indicate whether the target speaker exists and whether a direction of the target speaker changes. The tracking direction DI can indicate the direction of the target speaker.

When the target speaker exists and the direction of the target speaker changes (the flag information FL), the voice combining device 105 is configured to insert a voice segment with N seconds corresponding to a previous tracking direction in the voice data MD into a current position in the voice data MD to generate fusion voice data FD.

Then, the voice enhancement unit 1043 is configured to perform a voice enhancement process on the fusion voice data FD according to a current direction of the target speaker (the current tracking direction DI) to generate enhanced voice data ED. In some embodiments, the voice enhancement process includes a spatial filtering process and a noise reducing process. After performing the spatial filtering process and the noise reducing process on the enhanced voice data ED, the enhanced voice data ED has a higher signal-to-noise ratio (SNR).

Then, the voice shortening unit 1044 is configured to perform a voice shortening process on the enhanced voice data ED to generate voice output data OD. In some embodiments, since the voice combining device 105 inserts the voice segment with N seconds into the voice data MD, the voice shortening unit 1044 reduces voice data with N seconds from the enhanced voice data ED to eliminate N-seconds delay caused by inserting the voice segment.

The playing circuit 106 is configured to play the voice output data OD. The playing circuit 106 can be speakers, earphones, or various elements which can play voice data.

In some related approaches, the electrical device needs collect at least N seconds of voice data to obtain sufficient target speaker information (for example, voice characteristics of the target speaker) for subsequent processing. In addition, in some other related approaches, when the direction of the target speaker changes, the electrical device knows that the direction of the target speaker changes after N seconds. These will cause delay and distortion.

Compared to the aforementioned related approaches, the present disclosure inserts the voice segment corresponding to the previous tracking direction into the current position of the voice data, and performs the enhancement process on the fusion voice data FD according to the current tracking direction, and then shortens the enhanced voice data ED. Accordingly, the voice capturing system 100 of the present disclosure does not need to wait for N seconds, thereby avoiding delay and distortion.

In addition, when the direction of the target speaker does not change, the voice capturing system 100 does not need to wait to acquire new target speaker information.

Figure 2:
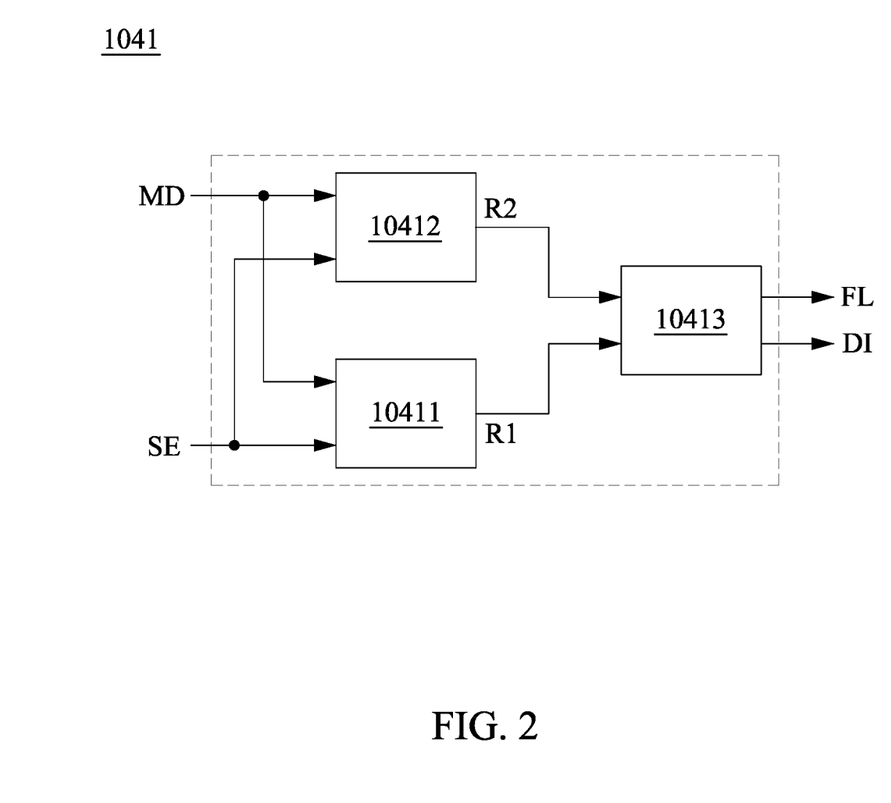
FIG. 2 is a schematic diagram of a target speaker tracking unit according to some embodiments of the present disclosure.

Reference is made to FIG. 2. FIG. 2 is a schematic diagram of the target speaker tracking unit 1041 according to some embodiments of the present disclosure.

As illustrated in FIG. 2, the target speaker tracking unit 1041 includes a detecting unit 10411, a localization unit 10412, and a tracking unit 10413.

The detecting unit 10411 is configured to generate a detection result R1 according to one of the voice data MD from the buffer 102 and the target speaker information SE. The detection result R1 can indicate whether the target speaker exists. In some embodiments, the detecting unit 10411 determines whether the target speaker exists, according to one of the voice data MD and the target speaker information SE, by utilizing a deep learning process to generate the detection result R1.

The localization unit 10412 is configured to generate an estimation direction R2 according to the voice data MD from the buffer 102 and the target speaker information SE. As described above, the voice data MD is from the plurality of microphones, a relationship between a time difference and an incident angle of the voice is described in formula (1) below:

$$\tau = \frac{d \times \sin\theta}{c} \qquad \text{formula (1)}$$

in which $\tau$ is the time difference, d is a distance between the two microphones, $\theta$ is the incident angle which is between the incident angle of the voice and a perpendicular bisector of the two microphones, c is the sound velocity.

In some embodiments, the localization unit 10412 utilizes a deep learning process to enhance voice data of the target speaker (target speaker voice data) in the voice data MD, and utilizes the spatial relationship of formula (1) to map the enhanced signal into a spatial arrangement (spatial arrangement calculation process) to acquire the estimation direction R2. In some other embodiments, the localization unit 10412 can utilize the deep learning process to generate the estimation direction R2.

The tracking unit 10413 is configured to generate the flag information FL and the tracking direction DI according to the detection result R1, the estimation direction R2, and a previous tracking direction. For example, the tracking unit 10413 can determine whether the target speaker exists according to the detection result R1, generate the current tracking direction DI according to the estimation direction R2 to indicate the current direction of the target speaker, and determine the current tracking direction according to the detection result R1 and the estimation direction R2. Then, the tracking unit 10413 can determine whether the direction of the target speaker changes according to the previous tracking direction and the estimation direction R2 to generate the flag information FL. To be more specific, when the estimation direction R2 is different from the previous tracking direction of the tracking unit 10413, the tracking unit 10413 determines that the direction of the target speaker has been changed.

In some embodiments, the artificial neural networks of the aforementioned deep learning processes can be trained in advance.

Figure 3:
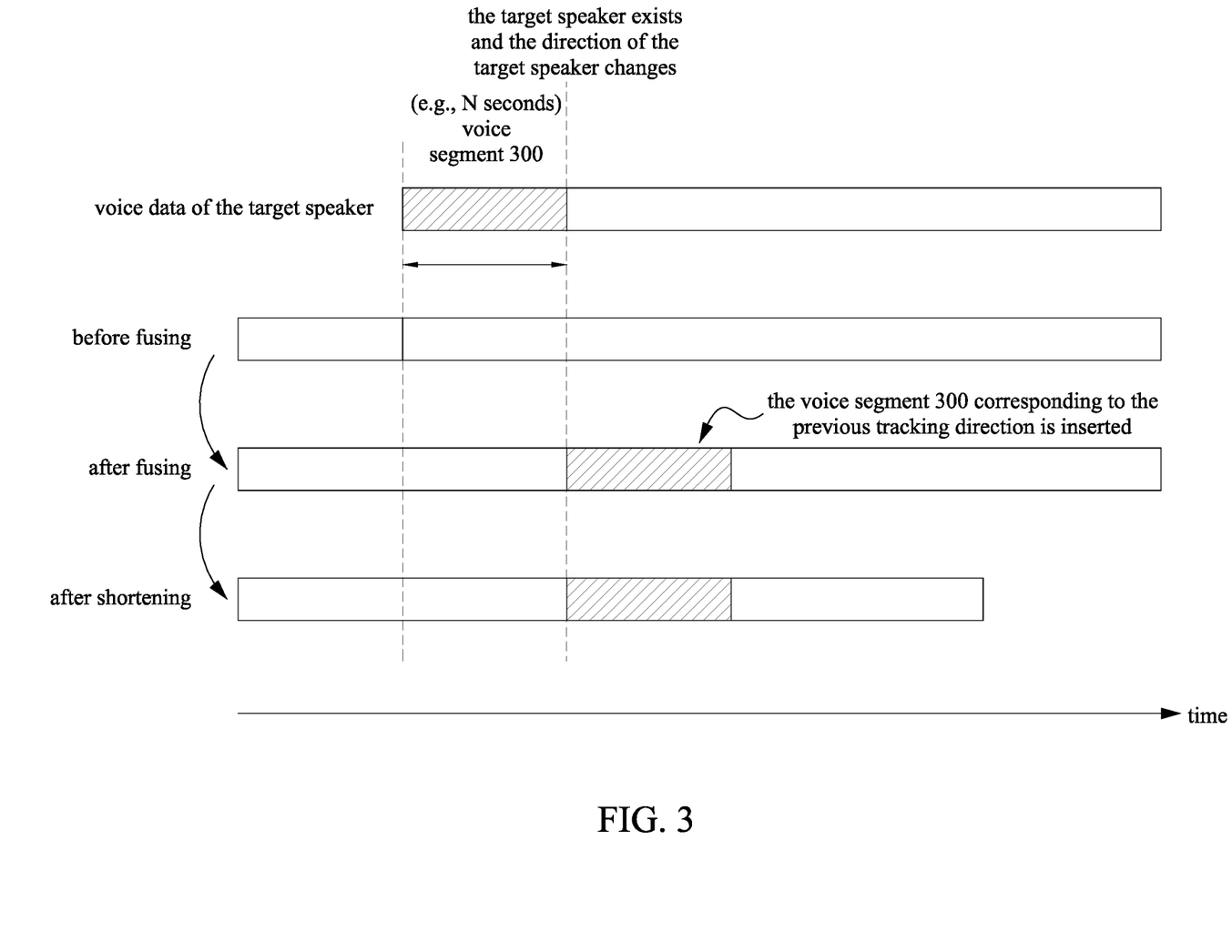
FIG. 3 is a schematic diagram of a voice fusion process and a voice shortening process according to some embodiments of the present disclosure.

References are made to FIG. 1 and FIG. 3. FIG. 3 is a schematic diagram of a voice fusion process and a voice shortening process according to some embodiments of the present disclosure.

As described above, when the direction of the target speaker changes, the voice combining device 105 is configured to insert a voice segment 300 with N seconds corresponding to the previous tracking direction in the voice data MD stored in the buffer 102 into the current position in the voice data MD to generate the fusion voice data FD.

Figure 4:
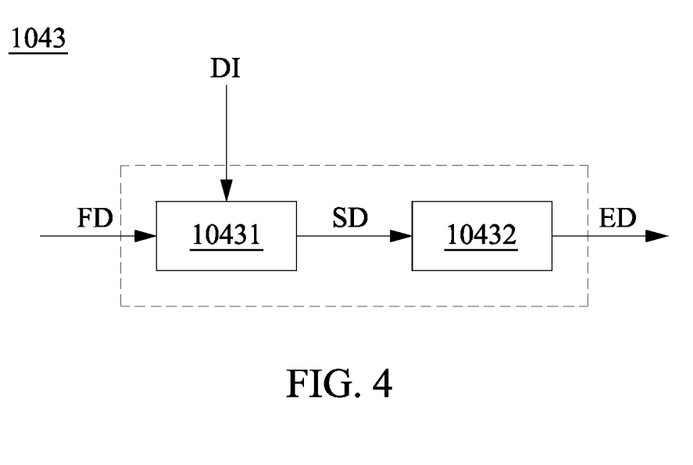
FIG. 4 is a schematic diagram of a voice enhancement unit according to some embodiments of the present disclosure.

Reference is made to FIG. 4. FIG. 4 is a schematic diagram of the voice enhancement unit 1043 according to some embodiments of the present disclosure. As illustrated in FIG. 4, the voice enhancement unit 1043 includes a spatial filtering unit 10431 and a noise reducing unit 10432.

The spatial filtering unit 10431 is configured to perform the spatial filtering process on the fusion voice data FD according to the current direction of the target speaker (the current tracking direction DI) to generate spatial-filtered voice data SD. The spatial filtering process is, for example, a beamforming process, a blind source separation process, or a deep learning process. The spatial filtering process can enhance the voice corresponding to the current tracking direction.

The noise reducing unit 10432 is configured to perform the noise reducing process on the spatial-filtered voice data SD to generate the enhanced voice data ED. In some embodiments, the SNR conversion function of the noise reducing unit 10432 can be designed according to the voice data MD and the noise type to suppress background noise and improve voice quality. In some other embodiments, the noise reducing unit 10432 can utilize a deep learning process to estimate voice signals or voice masks.

In addition, the noise reducing unit 10432 in FIG. 4 is disposed at an output terminal of the spatial filtering unit 10431, but the present disclosure is not limited thereto. In some other embodiments, the noise reducing unit 10432 can be disposed at an input terminal of the spatial filtering unit 10431.

Figure 5:
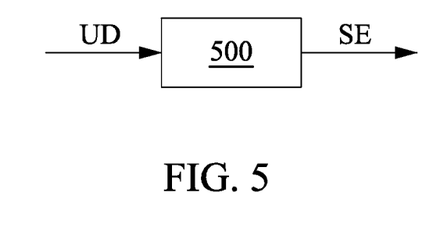
FIG. 5 is a schematic diagram of a target speaker information generating unit according to some embodiments of the present disclosure.

Reference is made to FIG. 1 and FIG. 5. FIG. 5 is a schematic diagram of a target speaker information generating unit 500 according to some embodiments of the present disclosure. In some embodiments, the voice capturing system 100 in FIG. 1 further includes the target speaker information generating unit 500.

As described above, in some embodiments, the target speaker can pre-record a voice speech (target speaker voice UD) in a noise-free or low-noise environment. Then, the target speaker information generating unit 500 can perform the factor analysis on the target speaker voice UD to obtain i-vector or can perform the deep learning process on the target speaker voice UD to obtain x-vector. The i-vector or the x-vector is the target speaker information SE (voice characteristics of the target speaker). In some embodiments, the target speaker information SE can be stored temporarily in a register or in a memory.

References are made to FIG. 1 and FIG. 3 again. The voice shortening unit 1044 is configured to perform the voice shortening process on the enhanced voice data ED to generate voice output data OD. As illustrated in FIG. 3, the voice shortening unit 1044 is configured to shorten a voice segment (e.g., N seconds) from the enhanced voice data ED to generate the voice output data OD so as to avoid introducing delays into subsequent voice data.

In some embodiments, the voice shortening unit 1044 superimposes two enhanced voice data ED according to a weighting window to generate the voice output data OD. In some other embodiments, the voice shortening unit 1044 determines whether there is at least one noise segment (e.g., N seconds in total) in the enhanced voice data ED. If there is at least one noise segment in the enhanced voice data ED, the voice shortening unit 1044 deletes the noise segment to generate the voice output data OD. In some other embodiments, the voice shortening unit 1044 can adjust a transmission rate of the enhanced voice data ED to generate the voice output data OD. For example, the voice shortening unit 1044 can speed up the transmission rate of the enhanced voice data ED (e.g., let the listener hear faster voice) to prevent the listener from experiencing the delay.

Figure 6:
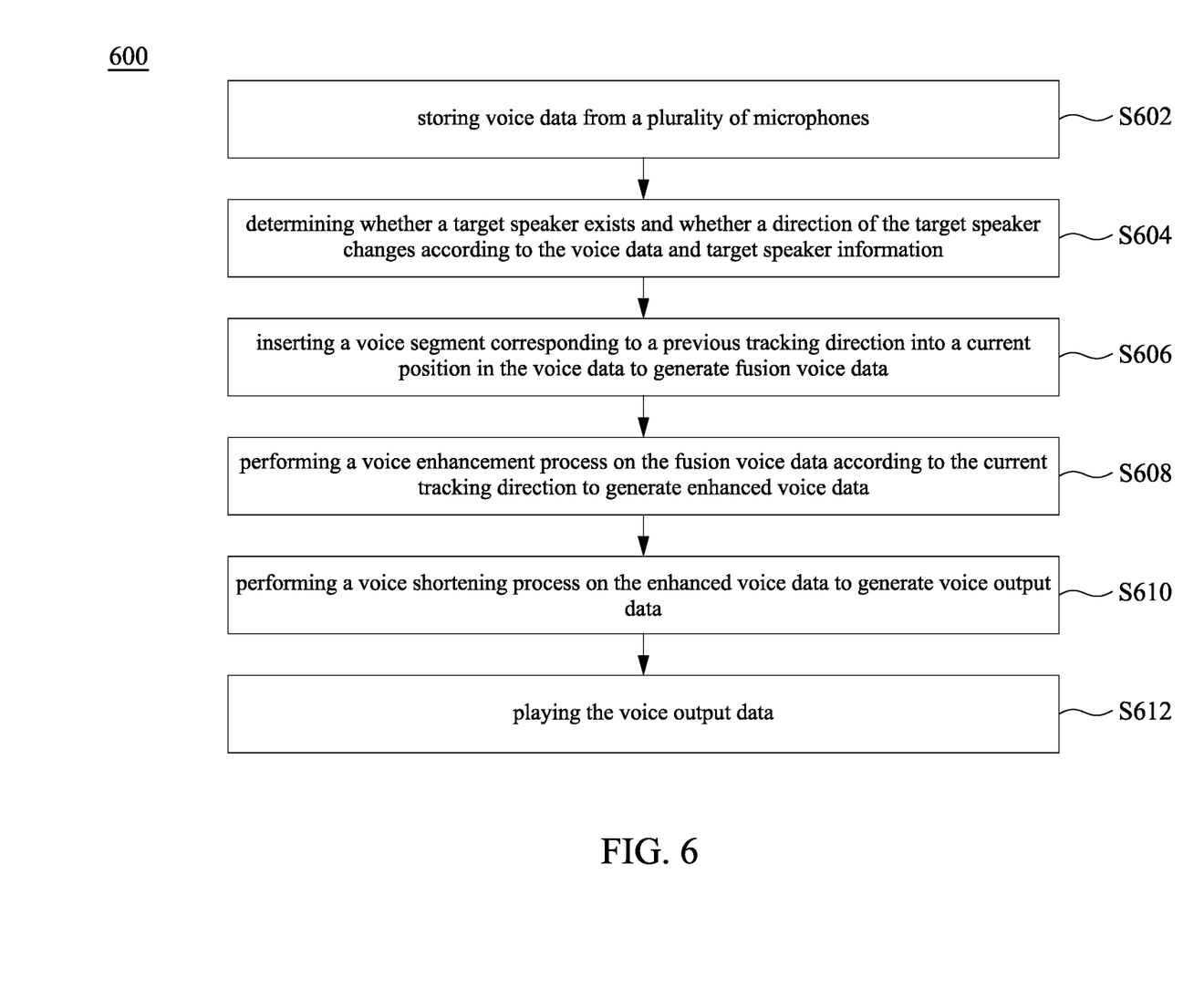
FIG. 6 is a flow diagram of a voice capturing method according to some embodiments of the present disclosure.

Reference is made to FIG. 6. FIG. 6 is a flow diagram of a voice capturing method 600 according to some embodiments of the present disclosure. The voice capturing method 600 includes operations S602, S604, S606, S608, S610, and S612. In some embodiments, the voice capturing method 600 is implemented in the voice capturing system 100 in FIG. 1, but the present disclosure is not limited thereto. However, for better understanding, the voice capturing method 600 in FIG. 6 is described with reference to the voice capturing system 100 in FIG. 1.

In operation S602, the buffer 102 stores the voice data MD from the microphones. In some embodiments, the microphones are included in a microphone array.

In operation 8604, the processor 104 determines whether the target speaker exists or whether the direction of the target speaker changes according to the voice data MD and the target speaker information SE. In some embodiments, the target speaker tracking unit 1041 generates the flag information FL and the tracking direction DI according to the voice data MD and the target speaker information SE. The flag information FL can indicate whether the target speaker exists and whether the direction of the target speaker changes. The tracking direction DI can indicate the direction of the target speaker.

In operation S606, the voice segment 300 with N seconds is inserted into the current position in the voice data MD to generate the fusion voice data FD. In some embodiments, when the flag information FL indicates that the target speaker exists and the direction of the target speaker changes, the voice combining device 105 inserts the voice segment 300 with N seconds corresponding to the previous tracking direction into the current position in the voice data MD to generate the fusion voice data FD.

In operation S608, the processor 104 performs the voice enhancement process on the fusion voice data FD according to the current direction of the target speaker (the current tracking direction DI) to generate the enhanced voice data ED. In some embodiments, the voice enhancement unit 1043 performs the spatial filtering process and the noise reducing process on the fusion voice data FD according to the current tracking direction indicated by the tracking direction DI to generate the enhanced voice data ED.

In operation S610, the processor 104 performs the voice shortening process on the enhanced voice data ED to generate the voice output data OD. In some embodiments, the voice shortening unit 1044 reduces voice data with N seconds in the enhanced voice data ED to eliminate N-seconds delay caused by inserting the voice segment 300.

In operation S612, the playing circuit 106 plays the voice output data OD. In some embodiments, the playing circuit 106 can be speakers, earphones, or various elements which can play voice data.

As described above, the voice capturing method and the voice capturing system of the present disclosure can prevent the voice data from being delayed and from being distorted when the direction of the target speaker changes.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A voice capturing method, comprising:
    storing, by a buffer, voice data from a plurality of microphones;
    determining, by a processor, whether a target speaker exists and whether a direction of the target speaker changes according to the voice data and target speaker information;
    inserting a voice segment corresponding to a previous tracking direction into a current position in the voice data to generate fusion voice data when the target speaker exists and the direction of the target speaker changes from the previous tracking direction to a current tracking direction;
    performing, by the processor, a voice enhancement process on the fusion voice data according to the current tracking direction to generate enhanced voice data;
    performing, by the processor, a voice shortening process on the enhanced voice data to generate voice output data; and
    playing, by a playing circuit, the voice output data.

2. The voice capturing method of claim 1, wherein determining, by the processor, whether the target speaker exists and whether the direction of the target speaker changes according to the voice data and the target speaker information comprises:
    determining, by the processor, whether the target speaker exists according to one of the voice data and the target speaker information to generate a detection result; and
    determining, by the processor, the direction of the target speaker according to the voice data and the target speaker information to generate an estimation direction; and
    determining, by the processor, whether the target speaker exists and whether the direction of the target speaker changes according to the detection result, the estimation direction, and the current tracking direction.

3. The voice capturing method of claim 2, wherein determining, by the processor, the direction of the target speaker according to the voice data and the target speaker information to generate the estimation direction comprises:
    utilizing, by the processor, a deep learning process to enhance the voice data and to extract target speaker voice data corresponding to the target speaker; and
    mapping, by the processor, an enhanced signal into a spatial arrangement to perform a spatial arrangement calculation process so as to generate the estimation direction.

4. The voice capturing method of claim 1, wherein performing, by the processor, the voice enhancement process on the fusion voice data according to the current tracking direction comprises:
    performing, by the processor, a spatial filtering process on the fusion voice data according to the current tracking direction to generate spatial-filtered voice data.

5. The voice capturing method of claim 4, wherein the spatial filtering process comprises a beamforming process, a blind source separation process, or a deep learning process.

6. The voice capturing method of claim 4, wherein performing, by the processor, the voice enhancement process on the fusion voice data according to the current tracking direction comprises:
    performing, by the processor, a noise reducing process on the spatial-filtered voice data to generate the enhanced voice data.

7. The voice capturing method of claim 1, wherein the voice segment has N seconds, wherein performing, by the processor, the voice shortening process on the enhanced voice data to generate the voice output data comprises:
    shortening, by the processor, voice data with N seconds from the enhanced voice data to generate the voice output data.

8. The voice capturing method of claim 7, wherein shortening, by the processor, the voice data with N seconds from the enhanced voice data to generate the voice output data comprises:
    superimposing, by the processor, the enhanced voice data according to a weighting window to generate the voice output data.

9. The voice capturing method of claim 7, wherein shortening, by the processor, the voice data with N seconds from the enhanced voice data to generate the voice output data comprises:
    determining, by the processor, whether there is at least one noise segment in the enhanced voice data; and
    deleting, by the processor, the at least one noise segment to generate the voice output data.

10. The voice capturing method of claim 7, wherein shortening, by the processor, the voice data with N seconds from the enhanced voice data to generate the voice output data comprises:
    adjusting, by the processor, a transmission rate of the enhanced voice data to generate the voice output data.

11. A voice capturing system, comprising:
    a buffer configured to store voice data from a plurality of microphones;
    a processor configured to determine whether a target speaker exists and whether a direction of the target speaker changes according to the voice data and target speaker information; and
    a memory, wherein the memory is configured to insert a voice segment corresponding to a previous tracking direction into a current position in the voice data to generate fusion voice data when the target speaker exists and the direction of the target speaker changes from the previous tracking direction to a current tracking direction,
    wherein the processor is further configured to perform a voice enhancement process on the fusion voice data according to the current tracking direction to generate enhanced voice data, and perform a voice shortening process on the enhanced voice data to generate voice output data,
    wherein the voice output data is played by a playing circuit.

12. The voice capturing system of claim 11, wherein the processor is further configured to determine whether the target speaker exists according to one of the voice data and the target speaker information to generate a detection result, determine the direction of the target speaker according to the voice data and the target speaker information to generate an estimation direction, and determine whether the target speaker exists and whether the direction of the target speaker changes according to the detection result, the estimation direction, and the current tracking direction.

13. The voice capturing system of claim 12, wherein the processor is further configured to utilize a deep learning process to enhance the voice data and to extract target speaker voice data corresponding to the target speaker, and then to map an enhanced signal into a spatial arrangement to perform a spatial arrangement calculation process so as to generate the estimation direction.

14. The voice capturing system of claim 11, wherein the processor is further configured to perform a spatial filtering process on the fusion voice data according to the current tracking direction to generate spatial-filtered voice data.

15. The voice capturing system of claim 14, wherein the spatial filtering process comprises a beamforming process, a blind source separation process, or a deep learning process.

16. The voice capturing system of claim 14, wherein the processor is further configured to perform a noise reducing process on the spatial-filtered voice data to generate the enhanced voice data.

17. The voice capturing system of claim 11, wherein the processor is further configured to shorten voice data with N seconds from the enhanced voice data to generate the voice output data.

18. The voice capturing system of claim 17, wherein the processor is further configured to superimpose the enhanced voice data according to a weighting window to generate the voice output data.

19. The voice capturing system of claim 17, wherein the processor is further configured to determine whether there is at least one noise segment in the enhanced voice data and delete the at least one noise segment to generate the voice output data.

20. The voice capturing system of claim 17, wherein the processor is further configured to adjust a transmission rate of the enhanced voice data to generate the voice output data.

\* \* \* \* \*